Nov. 21, 1967     D. D'EUSTACHIO ET AL     3,354,024
CELLULAR GLASS NODULES AND METHOD OF MAKING THEM
Filed July 23, 1963
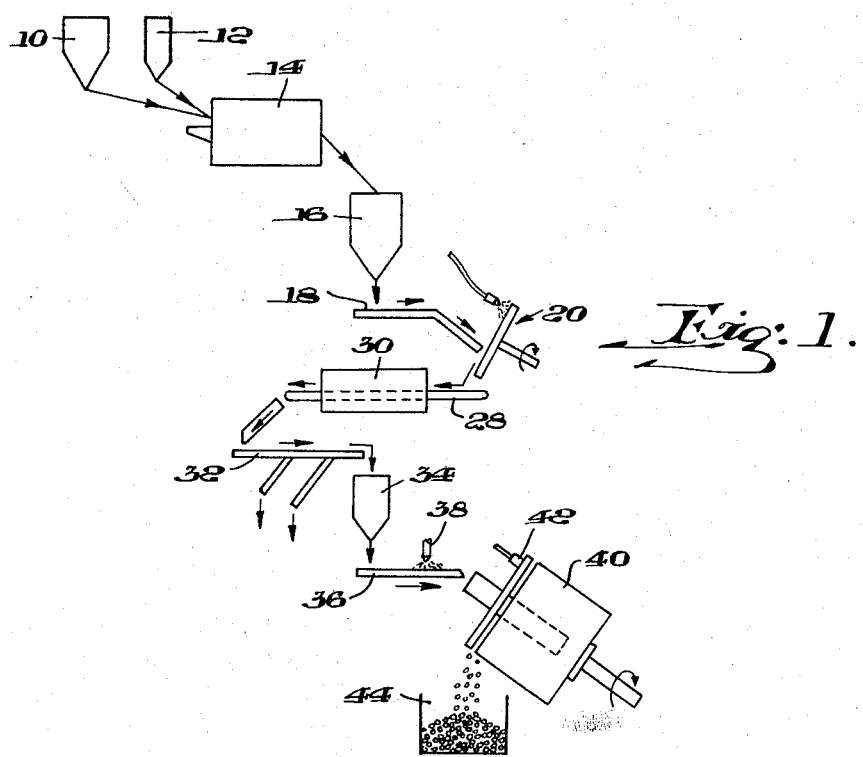
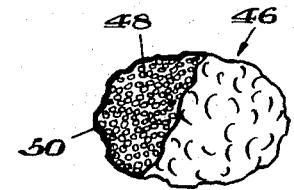
Fig. 3.
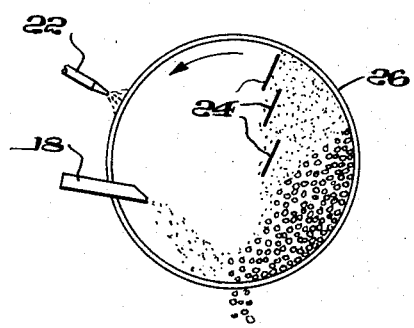
Fig. 2.
INVENTORS.
DOMINIC D'EUSTACHIO,
WALTER D. FORD,
BY HOWARD E. JOHNSON.
their
ATTORNEY.

United States Patent Office 3,354,024
Patented Nov. 21, 1967

3,354,024
CELLULAR GLASS NODULES AND METHOD OF MAKING THEM
Dominic D'Eustachio, Pittsburgh, Walter D. Ford, Murraysville, and Howard E. Johnson, Trafford, Pa., assignors to Pittsburgh Corning Corporation, Port Allegany, Pa., a corporation of Pennsylvania
Filed July 23, 1963, Ser. No. 297,023
8 Claims. (Cl. 161—168)

ABSTRACT OF THE DISCLOSURE

A cellular glass nodule prepared by mixing particulate glass, a cellulating agent and a liquid binder that contains a glass fluxing agent. The mixture is pelletized and dried so that at least part of the glass fluxing agent migrates toward the surface of the pellets. The pellets are then coated with a glass former parting agent. The coated pellets are heated in a rotary kiln to a temperature where a portion of the glass former parting agent and the glass fluxing agent form a thin skin on the pellets and cellulate the particulate glass in the pellets to form cellular glass nodules.

---

This invention relates to a cellular glass nodule, the method of making the same, and more particularly to a low density cellular glass nodule having an outer surface of a material that differs in composition from the cellulated core.

In the past cellular glass has been made by processes disclosed in U.S. Patents 2,123,536, 2,611,712, 2,775,524, 2,860,997, 2,955,049, and 2,946,693. This prior art teaches the making of cellular glass blocks for thermal insulation and the like. For many applications small nodules of cellular glass are more desirable.

U.S. Patent 2,691,248, assigned to the assignee of the present invention, discloses a method of forming cellular glass nodules that have an outer skin of sintered glass and a core of cellulated glass of the same composition. The process taught by this patent includes admixing glass particles with a cellulating agent and comminuting the admixture in a ball mill. The comminuted admixture is then formed into briquets by means of a briquetting machine or the like. The briquets are subjected to a sintering temperature of between 1400° F. to 1450° F. for a sufficient time to thermally decompose the cellulating agent on the outer surface of the nodule so that the outer surface consists essentially of the glass in the original admixture. The sintered briquets are thereafter further heated to a temperature of between 1600° F. and 1700° F. where cellulation of the inner core occurs. The cellular glass nodules made according to the process described in the above patent have a skin of uncellulated glass of the same composition as the original glass. The outer skin of uncellulated glass, especially in small diameter nodules, increases substantially the density of the nodules.

For many applications it is highly desirable to have cellular glass nodules of a density below that taught in U.S. Patent 2,691,248. It is further desirable to have cellular glass nodules which have an outer skin that is more chemically durable than a skin formed of the glass composition forming the core of the nodule without incurring the added glass batch cost and cellulating difficulties that are associated with highly durable glasses. Moreover, a glass nodule which has both a low density and a chemically durable external surface is useful in many applications where either density or chemical durability of the nodule is one of the controlling factors in its end use. For example, the density of the glass nodule is of importance where the glass nodule is used as a thermal insulation in building materials and as a filler for such materials as mastics, plastics or the like, because thermal conductivity of cellular nodules is approximately proportional to density. The chemical durability of the nodule surface is of substance when the nodules are used as a diluent or filler for concrete or other chemically active substances. The chemically durable surface of the nodule reduces substantially the degradation of the nodules by the reaction of the glass nodules with the active constituents of the concrete or other chemically active substance. The cost of making the nodules is also a substantial factor in their commercial utility. The process taught in U.S. Patent 2,691,248 requires the nodules to be first sintered and thereafter further heated to a cellulating temperature. As an alternate, Patent 2,691,248 describes a process where the sintered mass is crushed and thereafter cellulated. We have discovered a process for making cellular glass nodules that does not require a separate sintering step before cellulation, yet with our process we obtain nodules that have all the desirable properties of the nodules made by the known process and additionally can have lower densities and a more chemically durable outer surface.

We have discovered a process for making cellular glass nodules which have a low density, substantially uniform core, and a thin, durable outer surface of a glassy material differing from the glass composition of the cellular core.

Throughout the specification the terms "glass former" and "fluxing agent" will be employed to describe materials used in our process to produce cellular glass nodules having the above described properties. The term "glass former" is intended to designate a pulverulent material that melts and forms a viscous liquid upon heating to a predetermined temperature, and upon cooling solidifies into a relatively solid noncrystalline mass which is commonly called a glass. Certain of the glass formers have a high melting point well above the temperature at which cellulation of our nodules takes place. This property makes it possible to use the glass former as a parting agent for the nodules during the cellulation process. The glass formers will, however, dissolve in a fluxing agent at a temperature much lower than the normal melting temperature of the glass former. The glass former can also be a reaction product that results when a nonglass forming parting agent is heated. The term "fluxing agent" is intended to designate a material which will wet, dissolve or react with the glass former at such lower temperature.

Briefly, our invention includes admixing formulated glass particles and a cellulating agent and then comminuting the admixture. The comminuted admixture is wetted with a material that contains a binder and a fluxing agent. The wetted admixture is pelletized and the pellets may be dried or cured to permit at least a part of the fluxing agent in the pellet to migrate to the pellet outer surface. The pellet external surface is coated with a glass former that also serves as a parting agent. A sufficient amount of the glass former is applied to the external surface of the pellet to prevent the pellets from agglomerating in the cellulating furnace. The coated pellets are then heated to a cellulating temperature within a rotating cellulating furnace. During cellulation a portion of the fluxing agent on the surface of the pellet reacts with or activates the glass former at the elevated temperature to form a thin skin of vitrified material having a composition different from the glass forming the cellulated core of the pellet. The cellular nodule formed by the above process has a low density and an external surface of a glassy material differing from the glassy material forming the cellulated core of the nodule.

The critical differentiation over the prior art of which we have knowledge resides in the fact that we employ a material that includes a fluxing agent and a binder as a wetting agent for the admixture of glass and cellulating agent and further that we employ a glass former as our parting agent to coat the surface of the pellet. During the cellulation of the pellet into a cellular nodule, the fluxing agent activates or dissolves a portion of the glass former at the cellulating temperature to form a glassy material on the surface of the nodule differing in composition from the composition of the nodule core.

The invention will be better understood by reference to the following description, examples, and the flow diagram shown in the accompanying drawings.

In the drawings:

FIGURE 1 is a flow diagram illustrating a method of making our improved cellular glass nodule.

FIGURE 2 is an enlarged view of the pelletizing disc for wetting the admixture of formulated glass and cellulating agent and pelletizing the same.

FIGURE 3 is a view in section of our improved cellular glass nodule.

Referring to FIGURE 1 the bin 10 contains formulated glass in crushed cullet form and bin 12 contains a suitable cellulating agent. The formulated glass contained in bin 10 may be the conventional lime-soda glass used to produce container glass articles and window glass and the conventional boro-silicate glass used to produce chemical ware. These formulated glasses are generally suitable for cellulation into our improved cellular glass nodules. The cellulating agent in bin 12 is preferably a carbonaceous material such as carbon black, lamp black, coal and the like. Carbon black has been found suitable. The cellulating agent may also be a combination of carbon black and sodium sulfate. The formulated glass from bin 10 and the cellulating agent from bin 12 are admixed in suitable proportions, for example, where carbon black is used it is preferable to add between 0.1 and 0.4 percent by weight of the cellulating agent to the formulated glass, where carbon black and sodium sulfate are used it is preferable to use between 0.4 and 0.8 percent by weight of the combination.

The cellulating agent and formulated glass are comminuted and admixed in a conventional ball mill 14 and discharged into a storage bin 16. A suitable glass nodule is obtained when the admixture is comminuted in the ball mill until about 95 percent of the admixture will pass through a 200 mesh screen.

The comminuted admixture is metered by suitable means from the bin 16 to a feeder device 18 that feeds the admixture to the pelletizing disc generally designated by the numeral 20. The pelletizing disc 20 is supported in an inclined position and is arranged to rotate as indicated. A plurality of scrapers 24 are arranged to remove the admixture which adheres to the base of the disc 20. The disc 20 has a peripheral side wall 26 that retains the pellets thereon until they have formed into suitable sizes. As is illustrated in FIGURE 2, the admixture fed by feeder 18 to the lower portion of the disc is wetted by the liquid binder sprayed onto the surface of the disc 20 by a suitable spray device 22. A suitable binder is a solution of about 1.3 percent sodium silicate by weight in water. The sodium silicate serves as a binder to aid in the agglomeration of the particles into pellets and, as will be later described, functions as a flux for the glass former coating on the pellets. It is preferable that the fluxing agent be soluble in water, as is the sodium silicate, but finely divided insoluble fluxing agents that function in the same manner may be used without departing from the scope of the invention.

The formed pellets of desired size containing about 12 percent by weight of the liquid binder are discharged from the pelletizing disc 20 onto a suitable conveying means. The green pellets can be air dried or subjected to drying in a low temperature oven. In FIGURE 1 for example, the green pellets are discharged from the pelletizing disc 20 onto a conveyor 28 and conveyed through a drying oven 30 where they are cured at a temperature of between 250° F. and 300° F. until substantially all the water is removed. If desired, the waste heat from the cellulating furnace can be employed to dry and cure the pellets. If cellular glass nodules of substantially the same size are desired, the cured pellets have sufficient body to be sorted according to size. Alternatively, the cellular glass nodules can be sorted according to size after the cellulation process.

In FIGURE 1 the cured pellets are classified according to size on a classifier 32 and pellets of preselected sizes are conveyed to a feeder bin 34. The pellets are dispensed from bin 34 to a suitable coating device 36 where the pellets are coated with a glass former-parting agent fed to the coating device 36 from a source 38. Alternatively, the uncoated pellets and the parting agent can be simultaneously introduced to the cellulating furnace and the pellets coated therein by the rotation of the furnace. The glass former-parting agent is preferably a material that, at a preselected cellulating temperature and in the presence of a fluxing agent forms a glass. The glass formed from the glass former-parting agent adheres to the surface of the cellular glass nodule and forms a skin of glass having a different composition than that of the core of the nodule. The glass former-parting agent, however, at the preselected cellulating temperature and not in the presence of a fluxing agent remains discrete and serves as a parting agent for the pellets during the cellulation process. We have found that $Al_2O_3$ in the form of a hydrate $Al_2O_3 : 3H_2O$, is a suitable material. Other materials which can be used are magnesium oxide, and calcium oxide. Any material which will melt at the cellulating temperature in the presence of a fluxing agent and remain discrete to serve as a parting agent at the same temperature in the absence of a fluxing agent is suitable for our process. We have also found that boron nitride can be used as a parting agent. Some of the boron nitride decomposes in the cellulating furnace and this decomposition product acts as glass former. A sufficient amount of the glass former-parting agent is applied to the surface of the cured pellets to prevent the pellets from adhering to each other while they are being cellulated in the cellulating furnace and still permit a portion of the material to interact with the fluxing agent to vitrify and adhere to the surface of the nodule. It has been found, for example, where $Al_3O_3:3H_2O$ is used that a minimum of .0031 gms. of $Al_2O_3:3H_2O$ per cm.$^2$ of surface area of the green pellets is required to prevent the pellets from agglomerating during cellulation.

The pellets coated with the parting agent are fed to a rotating cellulating furnace 40 which receives the pellets through an axial tubular inlet and discharges the pellets through a peripheral outlet. The furnace 40 is heated by means of a burner 42 to a sufficiently high temperature, for example about 1700° F., for cellulation of the nodules and for an interaction between a portion of the fluxing agent and the parting agent-glass former to promote the vitrification and fusion of the discrete particles of parting agent to each other and to the cellulated glass core. The temperature of the cellulating furnace is preferably below the fusion temperature of the parting agent so that the fluxing agent must be present to promote the fusion of the parting agent on the surface of the nodules. The cellular glass nodules with the modified outer skin are discharged into a suitable container 44 for further processing and use.

FIGURE 3 is a view in section illustrating our improved low density glass nodule 46 wherein the formulated glass has a core 48 with a uniform closed cell structure. The outer surface 50 is a thin skin of glassy material having a different composition than the core 48. The outer surface of the nodule 46 has a skin of glassy material formed by a combination of the glass former, the flux and the glass used for the nodules.

The following examples illustrate this invention, but are not intended as limitations thereof.

EXAMPLE I

A typical soda-lime-glass cullet was admixed with 0.4 percent by weight carbon black and 0.4 percent by weight sodium sulphate. The admixture was comminuted in a ball mill until more than 95 percent of the admixture passed through a 200 mesh screen. The admixture was wetted with a liquid binder consisting of 1.3 percent by weight sodium silicate in water. The wetted admixture contained about 12 percent by weight of the liquid binder. The admixture was pelletized and formed into green pellets having an approximate diameter of between about 5/16 of an inch and 3/8 of an inch. The pellets were dried in an oven at an approximate temperature of 250° F. for a period of about 8 hours. After this period there was no further weight loss by additional drying. The dried pellets were coated with aluminum hydrate and then subjected to a cellulating temperature of about 1600° F. in a cellulating furnace for a period of about 15 minutes. The cellular nodules had an approximate diameter of between 1/2 of an inch and 3/4 of an inch and a density of about .11 gram per cubic centimeter. The cellular nodules had a chemically durable surface coating of high alumina glass.

EXAMPLE II

A typical boro-silicate glass cullet was admixed with about 0.2 percent by weight carbon black. The admixture was comminuted until more than 95 percent passed through a 200 mesh screen. The admixture was wetted with a liquid binder having 1.3 percent by weight boric acid in water. The wetted admixture contained about 12 percent by weight of the liquid binder. The admixture was pelletized and formed green pellets having an approximate diameter of between about 5/16 of an inch and 3/8 of an inch. The pellets were dried in an oven at a temperature of approximately 250° F. for a period of about eight hours. The dried pellets were coated with aluminum hydrate and then subjected to a cellulating temperature of about 1675° F. in a cellulating furnace for a period of about 12 minutes. The cellular nodules had a diameter of about 7/16 of an inch to 5/8 of an inch and a density of about .16 gram per cubic centimeter. The cellular nodules had a chemically durable surface coating of high alumina glass.

EXAMPLE III

A typical boro-silicate glass cullet was admixed with about 0.2 percent by weight carbon black. The admixture was comminuted until more than 95 percent passed through a 200 mesh screen. The admixture was wetted with a liquid binder having 1.3 percent by weight sodium silicate in water. The wetted admixture contained about 12 percent by weight of the liquid binder. The admixture was pelletized and formed green pellets having an approximate diameter of between about 5/16 of an inch and 3/8 of an inch. The pellets were dried in an oven at a temperature of approximately 250° F. for a period of about 8 hours. The dried pellets were coated with calcium oxide and then subjected to a cellulating temperature of about 1675° F. in a cellulating furnace for a period of about 12 minutes. The cellular nodules had a diameter of about 7/16 of an inch to 5/8 of an inch and a density of about .16 gram per cubic centimeter. The cellular nodules had a surface higher in calcium oxide content than the glass used for the pellets.

EXAMPLE IV

The process of Example III was repeated using magnesium oxide as the coating material. The cellular nodules had a density of approximately .16 gram per cubic centimeter and a diameter of between 7/16 of an inch and 5/8 of an inch with a surface higher in magnesia than the glass used for the pellets.

EXAMPLE V

The process of Example I was repeated and green pellets having an approximate diameter of between 7/16 of an inch and 9/16 of an inch were dried. The pellets were coated with aluminum hydrate and subjected to a temperature of about 1575° F. in a cellulating furnace for a period of about 11 minutes. The cellular nodules had an approximate diameter of between 5/8 of an inch and 3/4 of an inch and a density of about .56 gram per cubic centimeter. The cellular nodules had a chemically durable surface coating of high alumina glass.

Although we do not wish to be bound by the theory that follows, we believe the following factors contribute substantially to our ability to obtain cellular nodules that have the previously described desirable properties. At least part of the fluxing agent which is admixed with the powdered glass and cellulating agent migrates to the pellet surface during the curing or drying of the pellet. A portion of the glass former-parting agent is wetted by and dissolved by the fluxing agent on the surface of the pellet during the cellulation process. The remainder of the glass former-parting agent remains pulverulent and functions as a parting agent to prevent agglomeration of the pellets during the cellulation process. The glass former-parting agent that goes into solution or melts in the presence of the fluxing agent wets the surface of the pellet and seals in substantially all of the gas generated during cellulation. Upon cooling, the surface of the nodule has a composition which is higher in the oxide corresponding to the metal or other negative ion present in the parting agent, than the original glass used for the nodules. As previously discussed, the parting agent-glass former may be a refractory oxide such as aluminum oxide, magnesium oxide and calcium oxide, or the material may be a non glass former-parting agent that oxidizes at elevated temperatures to become a glass former such as boron nitride.

According to the provisions of the patent statutes, the principle, preferred construction, and mode of operation of the invention has been explained, and what are considered the best embodiments have been illustrated and described. However, it should be understood that, within the scope of the appended claims, the invention may be practiced otherwise than as specifically illustrated and described.

We claim:

1. As an article of manufacture, a cellular nodule comprising a core of a cellular glassy material having a plurality of small uniform cohered bubbles of glass and a thin outer skin of a glassy material having a composition other than the composition of said core of glassy material, said skin of glassy material comprising the reaction product of a glass former parting agent and a glass fluxing agent, said glass fluxing agent having a melting point lower than the melting point of said core of cellular glassy material.

2. An article as defined in claim 1 having an apparent density of between .10 and .60 gram per cubic centimeter.

3. An article as defined in claim 1 in which the glassy material forming the outer skin of said nodule is the reaction product of a glass former parting agent selected from the group consisting of aluminum oxide, magnesium oxide, calcium oxide, the oxidized product of boron nitride and a glass fluxing agent.

4. As an article of manufacture for forming a cellular nodule comprising an admixture of particulate formulated glass, a cellulating agent and a glass fluxing agent in pellet form, with at least part of said glass fluxing agent on the outer surface of said pellet, said pellet having a surface coating of more than .003 gram of particulate glass former parting agent on each square centimeter of the surface of said pellet.

5. The method of forming cellular glass nodules having an outer surface of a composition other than the composition of the inside comprising admixing formulated glass particles and a cellulating agent, wetting said admixture with a material containing a binder and a glass fluxing agent, forming said wetted admixture into discrete pellets, treating said pellets so that at least part of said glass fluxing agent migrates to the surface of said pellets, coating the outer surface of said pellets with a glass former parting agent, and heating said pellets to a temperature sufficient to flux at least a portion of said glass former parting agent on the surface of said pellet to form a surface coating of a glassy material having a composition other than the composition of the inside of said pellets and cellulate said pellets to form cellular glass nodules.

6. A method of forming cellular glass nodules having an outer surface of a composition other than the composition of the inside cellular core comprising admixing particulate formulated glass and a cellulating agent, wetting said admixture with a liquid containing a binder and a glass fluxing agent, forming said wetted admixture into discrete pellets, drying said pellets so that at least part of said glass fluxing agent migrates to the surface of said pellet, admixing said cured pellets with a pulverulent glass former parting agent, and heating said admixture of said cured pellets and pulverulent glass former parting agent to a temperature sufficient to flux at least a portion of said glass former parting agent on the surface of said pellet to form a surface coating of a glassy material on the outer surface of said nodule having a composition other than the composition of the cellular core and cellulate said pellets to form cellular nodules.

7. A method of forming cellular glass nodules having an outer surface of a composition other than the composition of the cellular core comprising admixing particulate formulated glass and a cellulating agent, wetting said admixture with a liquid binder including a glass fluxing agent, forming said wetted admixture into discrete pellets, curing said pellets so that at least part of said glass fluxing agent migrates to the surface of said pellet, admixing said cured pellets with a pulverulent glass former parting agent, and heating said admixture of cured pellets and pulverulent glass former parting agent to a temperature sufficient to cellulate said pellets to form cellular nodules and to flux at least a portion of said glass former parting agent in the presence of said glass fluxing agent to form a surface coating of glassy material modified by said glass former parting agent on the outer surface of said nodule, said temperature being insufficient to melt said glass former in the absence of said fluxing agent.

8. The method of forming cellular glass nodules having an outer surface of a composition other than the composition of the cellular core comprising, forming discrete pellets of an admixture of formulated glass particles, a cellulating agent, a binder and a glass fluxing agent so that at least part of said glass fluxing agent migrates to the pellet outer surface, coating the outer surface of said pellets with a glass former parting agent, and heating said pellets to a temperature sufficient to dissolve a portion of said glass former parting agent on the outer surface of said pellets in said glass fluxing agent on the surface of said pellet to form a glassy surface thereon having a composition different from the particulate formulated glass particles in said admixture and cellulate said pellets to form cellular glass nodules.

References Cited
UNITED STATES PATENTS

| | | | |
|---|---|---|---|
| 2,015,381 | 9/1935 | Harding | 106—40 |
| 2,691,248 | 10/1954 | Ford | 65—22 |
| 2,786,772 | 3/1957 | Stewart et al. | 106—40 |
| 3,207,588 | 9/1965 | Stayter et al. | 65—21 |
| 3,250,603 | 5/1966 | Schott | 65—22 |

DONALL H. SYLVESTER, *Primary Examiner.*

G. R. MYERS, *Assistant Examiner.*